United States Patent
Kremmer et al.

(10) Patent No.: US 12,283,138 B2
(45) Date of Patent: Apr. 22, 2025

(54) DETERMINATION OF APPLIED LOADS ON VEHICLE TRACKS BY SENSORS ON WEIGHT-BEARING ROLLERS

(71) Applicant: Deere & Company, Moline, IL (US)

(72) Inventors: Martin Kremmer, Bettendorf, IA (US); Carroll C. Kellum, Cedar Falls, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 16/735,121

(22) Filed: Jan. 6, 2020

(65) Prior Publication Data
US 2021/0209869 A1   Jul. 8, 2021

(51) Int. Cl.
| G07C 5/02 | (2006.01) |
| B60W 50/14 | (2020.01) |
| B62D 55/15 | (2006.01) |
| G01K 13/08 | (2006.01) |
| G01L 5/00 | (2006.01) |

(52) U.S. Cl.
CPC ............ G07C 5/02 (2013.01); B60W 50/14 (2013.01); B62D 55/15 (2013.01); G01K 13/08 (2013.01); G01L 5/0038 (2013.01); B60W 2510/0638 (2013.01); B60W 2510/0666 (2013.01); B60W 2520/10 (2013.01); B60W 2530/10 (2013.01);
(Continued)

(58) Field of Classification Search
CPC . G07C 5/02; B60W 50/14; B60W 2510/0638; B60W 2510/0666; B60W 2520/10; B60W 2530/10; B60W 2710/0677; B60W 2720/10; B62D 55/15; B62D 11/183; G01K 13/08; G01L 5/0038; G60W 2710/0644; A01B 69/006
See application file for complete search history.

(56) References Cited

U.S. PATENT DOCUMENTS 5,587,698 A   12/1996 Genna
6,098,682 A   8/2000 Kis
(Continued)

FOREIGN PATENT DOCUMENTS

DE   10010011 A1   2/2001
DE   10017358 A1   10/2001
(Continued)

OTHER PUBLICATIONS

U.S. Appl. No. 16/122,275, filed Sep. 5, 2018 Application and Drawings, 44 pages.
(Continued)

*Primary Examiner* — Isaac G Smith
*Assistant Examiner* — Christopher George Fees
(74) *Attorney, Agent, or Firm* — Kelly, Holt & Christenson; Joseph R. Kelly

(57) ABSTRACT

A traction subsystem on a track vehicle has a first roller and a second roller. The first roller rotates either with an axle, or about an axle, and rotatably supports a track in opposition to a surface over which the track is traveling. A sensor is disposed relative to the first roller so that, as the first roller rotates, the sensor moves through a load bearing position in which the sensor is positioned between the axle and the track, bearing at least a portion of a load imposed by the track vehicle. The sensor illustratively senses pressure on the track, when in the load bearing position.

19 Claims, 12 Drawing Sheets

(52) U.S. Cl.
CPC ............... *B60W 2710/0644* (2013.01); *B60W 2710/0677* (2013.01); *B60W 2720/10* (2013.01)

(56) References Cited

U.S. PATENT DOCUMENTS

| | | | |
|---|---|---|---|
| 6,371,214 B1 | 4/2002 | Anwar | |
| 6,845,311 B1 | 1/2005 | Stratton | |
| 7,043,973 B2 | 5/2006 | Shepherd et al. | |
| 7,066,226 B1 | 6/2006 | Fiore | |
| 7,591,628 B2 | 10/2009 | Noonan et al. | |
| 8,087,216 B2 | 1/2012 | Noonan et al. | |
| 8,985,250 B1* | 3/2015 | Lussier | B62D 55/12 180/9.1 |
| 9,033,431 B1 | 5/2015 | Zuchoski et al. | |
| 9,188,980 B2 | 11/2015 | Anderson | |
| 9,228,875 B2 | 1/2016 | Lingle et al. | |
| 9,855,843 B2* | 1/2018 | Vik | B60K 31/00 |
| 9,868,482 B2* | 1/2018 | Rust | G01N 3/56 |
| 9,956,907 B2 | 5/2018 | Vandendriessche | |
| 9,989,976 B2 | 6/2018 | Garvin et al. | |
| 10,124,844 B2 | 11/2018 | Brinkley et al. | |
| 10,276,015 B2 | 4/2019 | Lang et al. | |
| 10,464,419 B2 | 11/2019 | Vik et al. | |
| 10,783,723 B2 | 9/2020 | Richard et al. | |
| 11,131,076 B2 | 9/2021 | Cherney et al. | |
| 11,541,952 B2* | 1/2023 | Stefano | G01K 3/14 |
| 2003/0093207 A1 | 5/2003 | Pallot | |
| 2006/0259225 A1 | 11/2006 | Ono | |
| 2008/0125947 A1 | 5/2008 | Hattori | |
| 2008/0199117 A1* | 8/2008 | Joki | F16C 19/522 384/448 |
| 2008/0208416 A1 | 8/2008 | Yuet et al. | |
| 2009/0182471 A1 | 7/2009 | Bucher | |
| 2010/0271191 A1 | 10/2010 | de Graff | |
| 2013/0298728 A1 | 11/2013 | Gartenmaier | |
| 2014/0116808 A1 | 5/2014 | Kile | |
| 2014/0236431 A1 | 8/2014 | Hendrickson | |
| 2014/0318236 A1 | 10/2014 | Lingle | |
| 2014/0320278 A1 | 10/2014 | Upchurch et al. | |
| 2014/0372006 A1 | 12/2014 | Hammerschmidt | |
| 2015/0081166 A1* | 3/2015 | Diekevers | B62D 55/14 701/34.4 |
| 2015/0217817 A1 | 8/2015 | Delisle et al. | |
| 2016/0221618 A1* | 8/2016 | Sidles | B62D 55/21 |
| 2016/0281335 A1* | 9/2016 | Benzal | E02F 3/32 |
| 2016/0114634 A1 | 10/2016 | Lubben | |
| 2017/0087987 A1* | 3/2017 | Vik | B60K 31/00 |
| 2017/0177011 A1* | 6/2017 | Garvin | B62D 55/244 |
| 2017/0240046 A1* | 8/2017 | Vik | E02F 9/02 |
| 2017/0287303 A1 | 10/2017 | Lang et al. | |
| 2018/0014467 A1 | 1/2018 | Lang et al. | |
| 2018/0093724 A1* | 4/2018 | Boily | B62D 55/244 |
| 2018/0120132 A1 | 5/2018 | Tanutama et al. | |
| 2018/0190045 A1* | 7/2018 | Richard | G07C 5/0808 |
| 2018/0265145 A1 | 9/2018 | Todd et al. | |
| 2019/0233030 A1* | 8/2019 | Stefano | B62D 55/08 |
| 2020/0071908 A1 | 3/2020 | Cherney et al. | |
| 2020/0262420 A1 | 8/2020 | Ikeda et al. | |
| 2021/0031844 A1* | 2/2021 | Poulin | B62D 11/20 |
| 2021/0173399 A1* | 6/2021 | Richard | B60W 40/12 |
| 2021/0237570 A1 | 8/2021 | Kremmer | |
| 2021/0253185 A1* | 8/2021 | Sauvageau | B62D 55/10 |
| 2021/0388575 A1 | 12/2021 | Cherney | |
| 2022/0248242 A1 | 8/2022 | Murai et al. | |

FOREIGN PATENT DOCUMENTS

| | | |
|---|---|---|
| DE | 102011052808 A1 | 1/2013 |
| DE | 202013101202 A1 | 3/2013 |
| DE | 102013018510 A1 | 5/2014 |
| DE | 112014005213 A1 | 8/2016 |
| EP | 3812249 A1 | 4/2021 |
| WO | 2017049393 A1 | 3/2017 |
| WO | WO2019109191 A1 | 6/2019 |

OTHER PUBLICATIONS

German Search Report issued in application No. DE102020214696.9, dated Jul. 30, 2021, 12 pages.

RFID Temperature Sensor Tags, Retrieved on Oct. 22, 2021, 16 pages.

U.S. Appl. No. 16/776,771, Application and Drawings filed Jan. 30, 2020, 45 pages.

U.S. Appl. No. 16/776,771, Office Action mailed on Jul. 20, 2022, 9 pages.

U.S. Appl. No. 17/461,171 Application and Drawings filed Aug. 30, 2021, 48 pages.

German Search Report issued to counterpart application No. 102019213240.5 dated Jan. 21, 2020 (14 pages).

U.S. Appl. No. 16/776,771 Final Office Action dated Oct. 5, 2022, 11 pages.

U.S. Appl. No. 17/461,171 Non Final Office Action dated Mar. 17, 2023, 12 pages.

U.S. Appl. No. 16/776,771 Notice of Allowance dated Feb. 1, 2023, 10 pages.

* cited by examiner ial pictorial illustration
DETERMINATION OF APPLIED LOADS ON VEHICLE TRACKS BY SENSORS ON WEIGHT-BEARING ROLLERS

FIELD OF THE DESCRIPTION

The present description relates to using a sensor on a load-bearing roller of a track vehicle. More specifically, the present description relates to sensing applied loads on tracks of the vehicle by one or more sensors mounted on a weight-bearing roller.

BACKGROUND

There are a wide variety of different types of mobile machines. Such mobile machines include, for instance, agricultural machines, forestry machines, construction machines and turf management machines. Many of these machines are propelled by a propulsion system (such as an engine) that drives ground-engaging elements, such as rubber tracks, through a transmission. Other machines have separate motors for each trade or for different sets of tracks.

The tracks improve handling in difficult terrain, reduce contact pressure between the machine and the ground, and increase the coefficient of traction of such vehicles. The tracks are often formed as a belt, with lugs either integrally formed with the belt, or fastened to the belt. The inside of the belt is driven by a drive roller, and is mounted for rotation about the drive roller and at least one idler roller.

During some operating conditions, the temperature of the tracks can increase undesirably. This can cause irreversible damage to the tracks. Therefore, it is not uncommon for manufacturers of track vehicles or tracks to impose speed restrictions in order to avoid overheating portions of the tracks.

The discussion above is merely provided for general background information and is not intended to be used as an aid in determining the scope of the claimed subject matter.

SUMMARY

A traction subsystem on a track vehicle has a first roller and a second roller. The first roller rotates either with an axle, or about an axle, and rotatably supports a track in opposition to a surface over which the track is traveling. A sensor is disposed relative to the first roller so that, as the first roller rotates, the sensor moves through a load bearing position in which the sensor is positioned between the axle and the track, bearing at least a portion of a load imposed by the track vehicle. The sensor illustratively senses pressure on the track, when in the load bearing position.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1A:
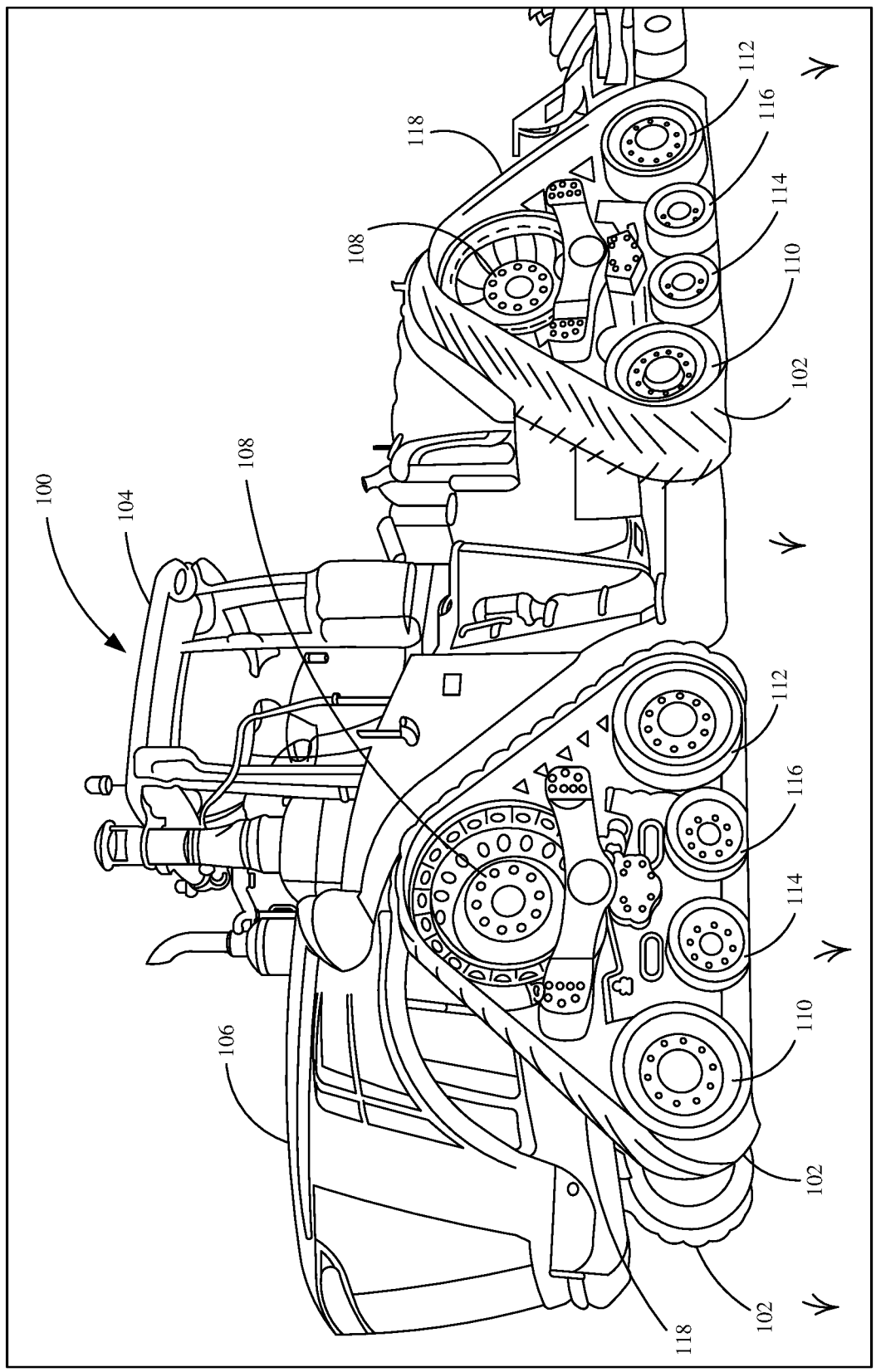
FIG. 1A is a pictorial illustration of a tractor that has a set of ground-engaging track subsystems.

FIG. 1A shows one example of a track vehicle (such as a tractor 100) with a set of ground-engaging track subsystems 102. In the example shown in FIG. 1A, tractor 100 illustratively has an operator compartment 104 and an engine compartment 106. An engine in engine compartment 106 illustratively drives rotation of track subsystems 102 through a transmission. In another example, each track subsystem 102 can have its own drive motor. In yet another example, sets of track subsystems 102 can share the same drive motor. For instance, the two track subsystems on one side of the tractor can be driven by one motor while the other two track subsystems can be driven by another motor. All of these, and other, configurations are contemplated herein.

In the example shown in FIG. 1A, each track subsystem 102 has a drive roller 108, a set of idler rollers 110 and 112, and a set of mid rollers 114 and 116. The rollers are illustratively rotate about (or along with) a separate axle that is mounted to a frame of tractor 100. The engine in engine compartment 106 illustratively generates power (e.g., hydraulic power, power to a transmission, etc.) that drives the drive rollers 108 which, in turn, drive tracks 118 to propel tractor 100.

In the example shown in FIG. 1A, it can be seen that idler rollers 110 and 112 are load bearing rollers which hold track 118 against the surface over which tractor 100 is traveling (e.g., against the ground). In some examples, mid rollers 114 and 116 can also be load bearing rollers. In other examples, either mid rollers 114 and 116 are somewhat retracted vertically relative to idler rollers 110 and 112, or vice versa, so that the retracted rollers do not bear as much load as idler rollers 110 and 112.

Figure 1B:
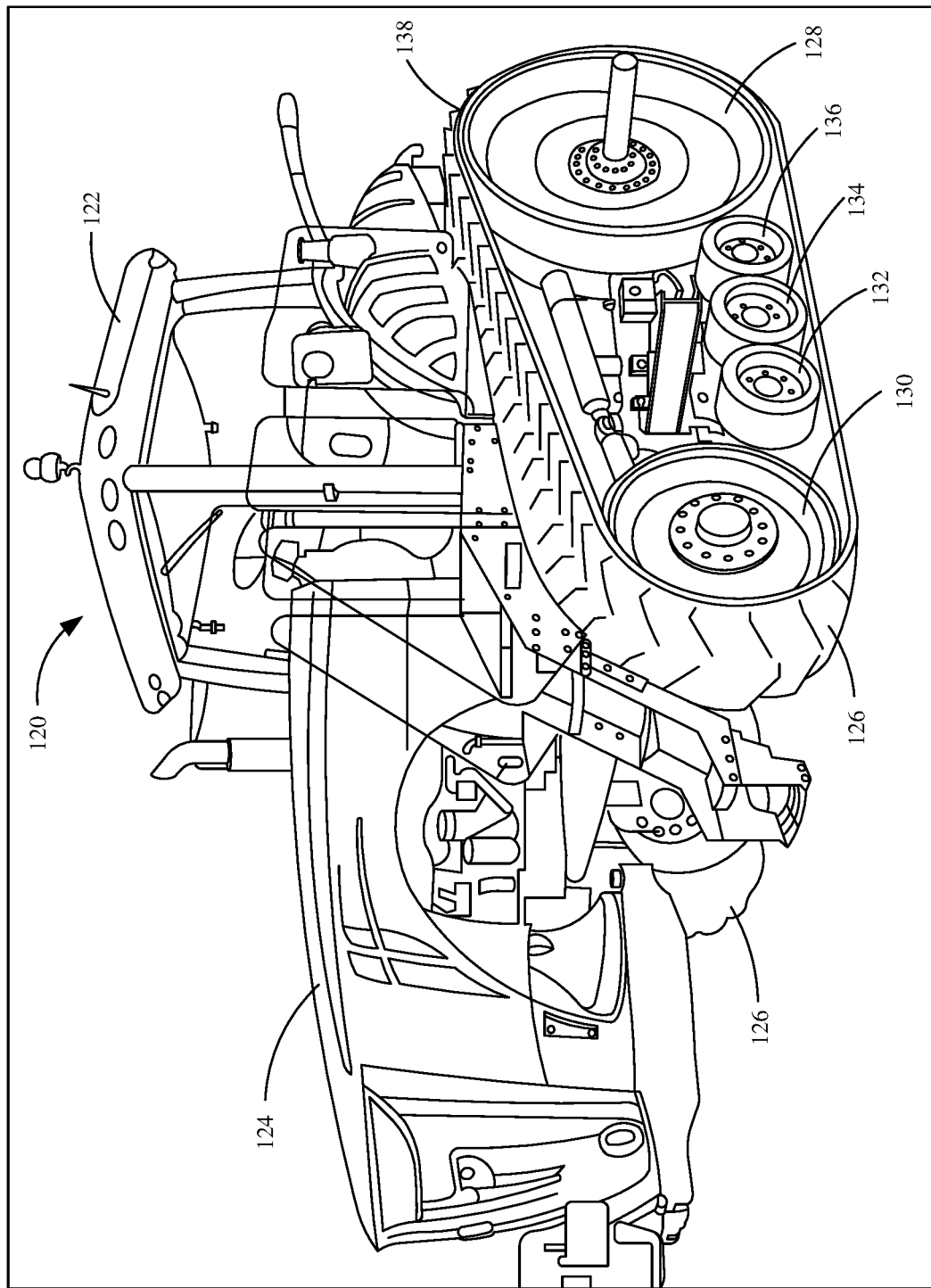
FIG. 1B is a pictorial illustration of a different tractor having a different set of ground-engaging track subsystems.

FIG. 1B is another example of a track vehicle, such as tractor 120. Tractor 120 illustratively has an operator compartment 122 and an engine compartment 124, as well as a set of track subsystems 126. In the example shown in FIG. 1B, track subsystem 126 has a drive wheel (or drive roller) 128 and an idler roller 130, as well as a set of mid rollers 132, 134 and 136. Track is driven by drive roller 128, and it is supported for rotation by rollers 130-136. It can also be seen that rollers 128 and 130 are load bearing rollers in that they bear against track 138 in opposition to the surface over which tractor 120 is traveling. Also, in some examples, mid rollers 132, 134 and 136 may be weight bearing rollers as well. In other examples, they are vertically retracted upwardly relative to rollers 128 and 130, or rollers 128 and 130 are retracted upward relative to rollers 132, 134 and 136 so the retracted rollers bear less weight.

Figure 1C:
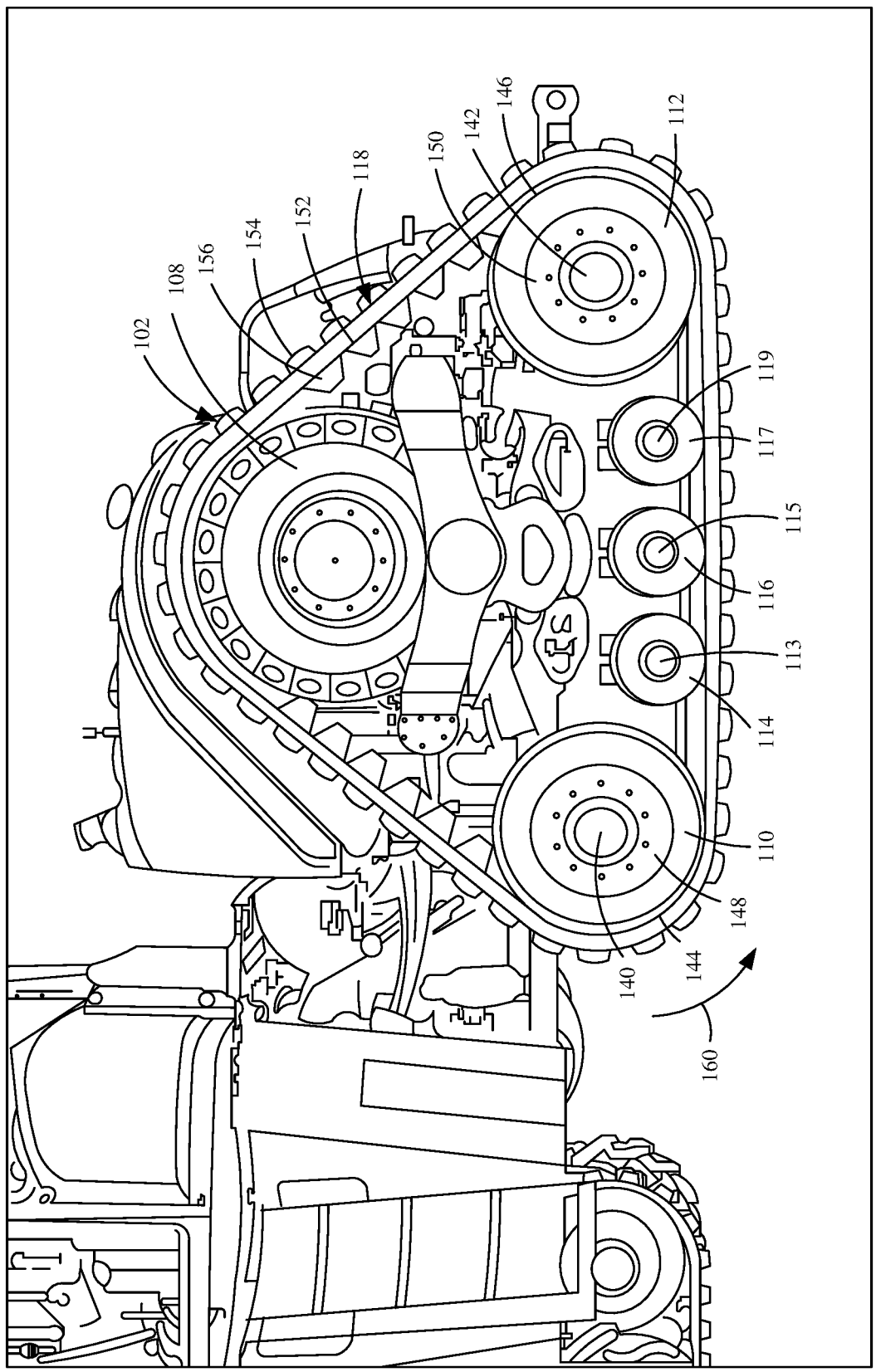
FIG. 1C is an enlarged view of a track subsystem, in more detail.

FIG. 1C is a pictorial illustration showing one example of a track subsystem 102, in more detail. Some of the items shown in FIG. 1C are similar to those shown in FIG. 1A, and they are similarly, numbered.

FIG. 1C shows that, instead of only having two mid rollers 114 and 116, track subsystem 102, shown in FIG. 1C, has a third mid roller 117 as well. FIG. 1C also shows that rollers 110 and 112 rotate about (or along with) axles 140 and 142, respectively. Rollers 114, 116 and 117 rotate about (or along with) axles 113, 115 and 119, respectively. Each of the rollers can be formed in a similar way as other rollers, or differently. For purposes of the present description, it is assumed that they are formed similarly so only one roller is described in more detail. Roller 110 is shown as having a rubber or polymer surface 144 that is disposed about, and supported by, a harder inner roller portion 148. The outer surface 144 engages an interior portion of track 118. Roller 112 is shown as having a rubber or polymer surface 146 that is disposed about, and supported by, a harder inner roller portion 150. The outer surface 146 engages an interior portion of track 118.

In the example shown in FIG. 1C, track 118 has a belt 152 with a plurality of lugs mounted thereto. The lugs 154 can be formed integrally with belt 152, or they can be attached to belt 152 after it is formed. FIG. 1C also shows that belt 118 has a plurality of inwardly directed teeth 156. Drive wheel 108 has corresponding notches that engage the inwardly directed teeth 156 to drive track 118, rotatably, about drive wheel 108 and idler rollers 110 and 112, as well as about mid rollers 114, 116 and 117.

As discussed above, tracks 118 can overheat in certain circumstances or under certain conditions. Overheating can occur for a number of different reasons. One reason is the repeated flexure of the track as it is intermittently loaded and unloaded during rotation. Heat generation can depend on the amount of pressure being repeatedly applied and removed and the speed at which it is repeatedly applied and removed. For instance, as track 118 rotates about roller in the direction indicated by arrow 160, the lugs 154 transition from a region above and forward of roller 110, where they are not bearing any of the tractor's weight (they are unloaded), into an area immediately below roller 110, where they are bearing the weight of the tractor against the track and the surface over which it is traveling (where they are loaded). The transition of each lug between the unloaded position (where it is not bearing the weight of the tractor), and the loaded position (where it is supporting the weight of the tractor) causes repeated flexing and compression of track 118, at the position of the lugs. Similarly, the lugs may transition from a partially loaded position to a loaded position (e.g., from an idler roller to a mid roller or from a mid roller to a mid roller) or vice versa. The amount of flexing is based on the amount of pressure repeatedly applied to, and removed from the track. The amount of heat generated is also based on the speed at which the flexing occurs (e.g., the travel speed of the track). The pressure along the track is determined by the weight being supported by the track, and by the surface area over which the weight is distributed. As the pressure on any given area of the track increases (such as at the position of the lugs), the track flexes at those point(s). The greater the pressure, the more the flexure. The heat generation during flexing increases the internal temperature of the track. The temperature at which the rubber begins to become irreversibly damaged is often below 200° C.

Thus, in order to avoid damage leading to failure, track and vehicle manufacturers often provide guidelines to operators regarding weights and travel speeds. Under these guidelines, as the weight supported by the track increases, the suggested travel speed decreases.

Even despite the speed restrictions and load restrictions, operators can still experience track failures due to the uneven distribution of load on a segment on the track. For instance, the supporting ground surface below the track is a parameter that is difficult to control, due to various traffic conditions. One example is where an operator is driving the tractor on a roadway, but where one half of the track (or more) hangs over the edge of the pavement and thus supports very little weight. In this scenario, the pressure across one area of the track decreases significantly, but the pressure across another area of the track increase significantly. As the pressure increases in one area, the heat generation local to that area also increases.

One difficulty that is encountered in attempting to measure the belt temperature is that, during operation, the track is continuously moving at a relatively high velocity. In addition, temperature development may occur on a very localized basis on the track.

The present description thus proceeds with respect to a system that provides a sensor on one or more weight bearing rollers such as the mid rollers 114 and 116 in FIG. 1A, or the mid rollers 132, 134 and 136 in FIG. 1B. It will also be appreciated that, to the extent the other rollers support the weight of the vehicle on which they are mounted, the sensor can be disposed on the other rollers as well.

The sensors sense the pressure on the track, as it is rotating. The sensed pressure can be used to estimate the temperature of the track so that operating conditions, under which track damage or failure can occur, can be detected. In one example, they are detected, prior to those conditions occurring. When they are detected, an action signal can be generated. The action signal can be used to perform such operations as alerting the operator, automatically reducing vehicle speed, communicating information about the detected conditions to a remote system, among other things.

Figure 1D:
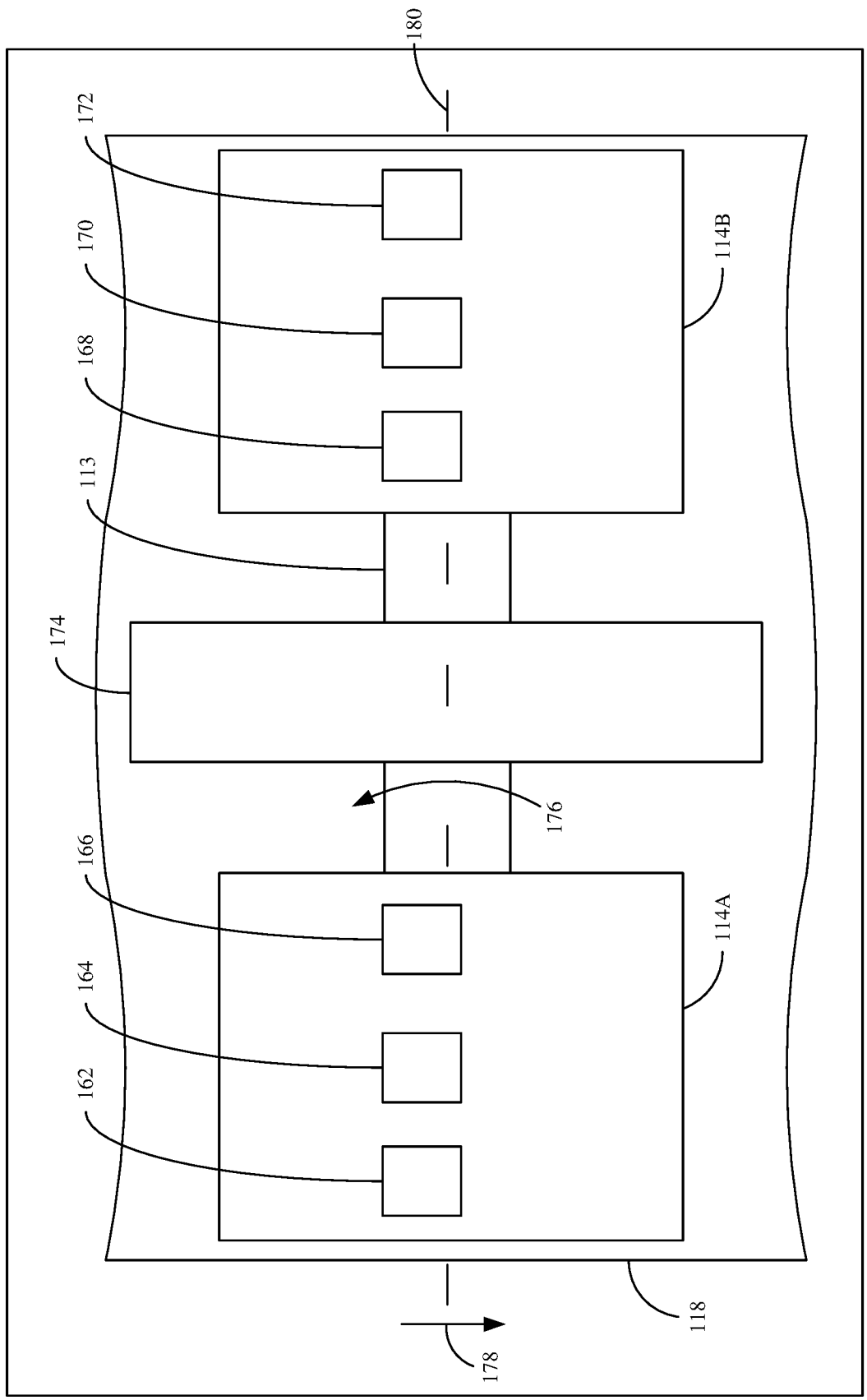
FIG. 1D is a partial schematic, partial pictorial illustration showing placement of a set of sensors.

FIG. 1D is a schematic view of a portion of track system 102, shown in FIG. 1C. FIG. 1D shows an example in which a plurality of sensors 162, 164, 166, 168, 170 and 172 are mounted to a set of mid rollers that rotate about (or along with) axle 113. FIG. 1D shows that, instead of having a single mid roller 114 (such as that shown in FIG. 1C) there is an outboard mid roller 114A and an inboard mid roller 114B that both rotate about (or along with) axle 113. They can be coupled to the frame of the tractor by a frame support portion 174. In one example, the track subsystem can have a frame that is mounted to the tractor frame through a suspension. Similarly, each roller assembly may be mounted to the frame of the track subsystem through a suspension as well. These are examples only.

FIG. 1D is a top down view of mid rollers 114A and 114B. Therefore, as the rollers 114A and 114B rotates about axis of rotation 180, in the direction indicated by arrow 176, track 118 moves in the direction indicated by arrow 178. The surface of rollers 114A and 114B bear against track 118, pressing it against the surface over which track 118 is traveling, under the weight of the tractor, as applied by the tractor frame through frame support member 174. Thus, when sensors 162-172 are rotated to a position where they are between the axle 113 and the track 118, they are in the loaded, or load sensing position.

In the example shown in FIG. 1D, each of the mid rollers 114A and 114B are formed of a relatively rigid underlying structural portion covered by a rubber or polymer covering. Sensors 162-172 are illustratively disposed in the rubber or polymer material that provides the covering of the mid rollers 114A and 114B, or they are disposed under the rubber or polymer covering, at the interface between the rubber or polymer covering and the underlying structural portion of the mid rollers 114A and 114B. Regardless of where they are located, they are illustratively configured to rotate between a non-load sensing position and a load sensing position when they are rotated to a position between track 118 and axle 113. When in the load sensing position, they sense a portion of the load that the tractor is placing on the track, through rollers 114A and 114B.

Also, as shown in FIG. 1D, a plurality of sensors 162-172 may be provided along the track in a direction transverse (e.g., perpendicular) to the direction of travel of the track, such as about the longitudinal axis 180 of axle 113. In this way, the pressure on the track (the localized load), across the width of the track can be sensed. It will be appreciated that, while a plurality of sensors 162-172 are provided in FIG. 1D, different configurations are contemplated herein. For instance, a different type of array of sensors, or a strip sensor that provides different outputs along its length, may be provided, instead of a plurality of discreet sensors, as shown in FIG. 1D. These and other configurations are contemplated herein.

Similarly, while FIG. 1D shows the plurality of sensors being disposed on the mid rollers 114A and 114B, they can instead, or in addition, be placed on the other mid rollers, on the idler rollers, or, in the example shown in FIG. 1B, on the drive roller as well. They can be placed on any rollers that are a load bearing rollers.

Referring again to the example shown in FIG. 1D, as the mid rollers 114A and 114B rotate, the sensors are intermittently positioned between the axle 113 and the track 118. In this position (the load sensing position) the sensors sense, and generate a sensor signal indicative of, the pressure being exerted on the track 118 by the tractor, against the surface over which it is traveling. Because multiple sensors are positioned across the width of the track, the pressure distribution across the width of track 118 can be sensed as well.

Before describing the sensors and sensor signals in more detail, FIG. 2 will be described, which shows a block diagram of one example of a track vehicle control system 182 that can be used to control a track vehicle based on the sensor signals from sensors 162-172. In the example shown in FIG. 2, track vehicle control system 182 illustratively includes pressure sensors 162-172. It can also include pressure sensors that are mounted to sense the pressure on other track subsystems on the track vehicle as well. For instance, where there are four track subsystems on a tractor, there may be four sets of sensors that are used to sense the pressure on the tracks of all four track subsystems. The present description proceeds with respect to sensors 162-172 for the sake of example only.

Figure 2:
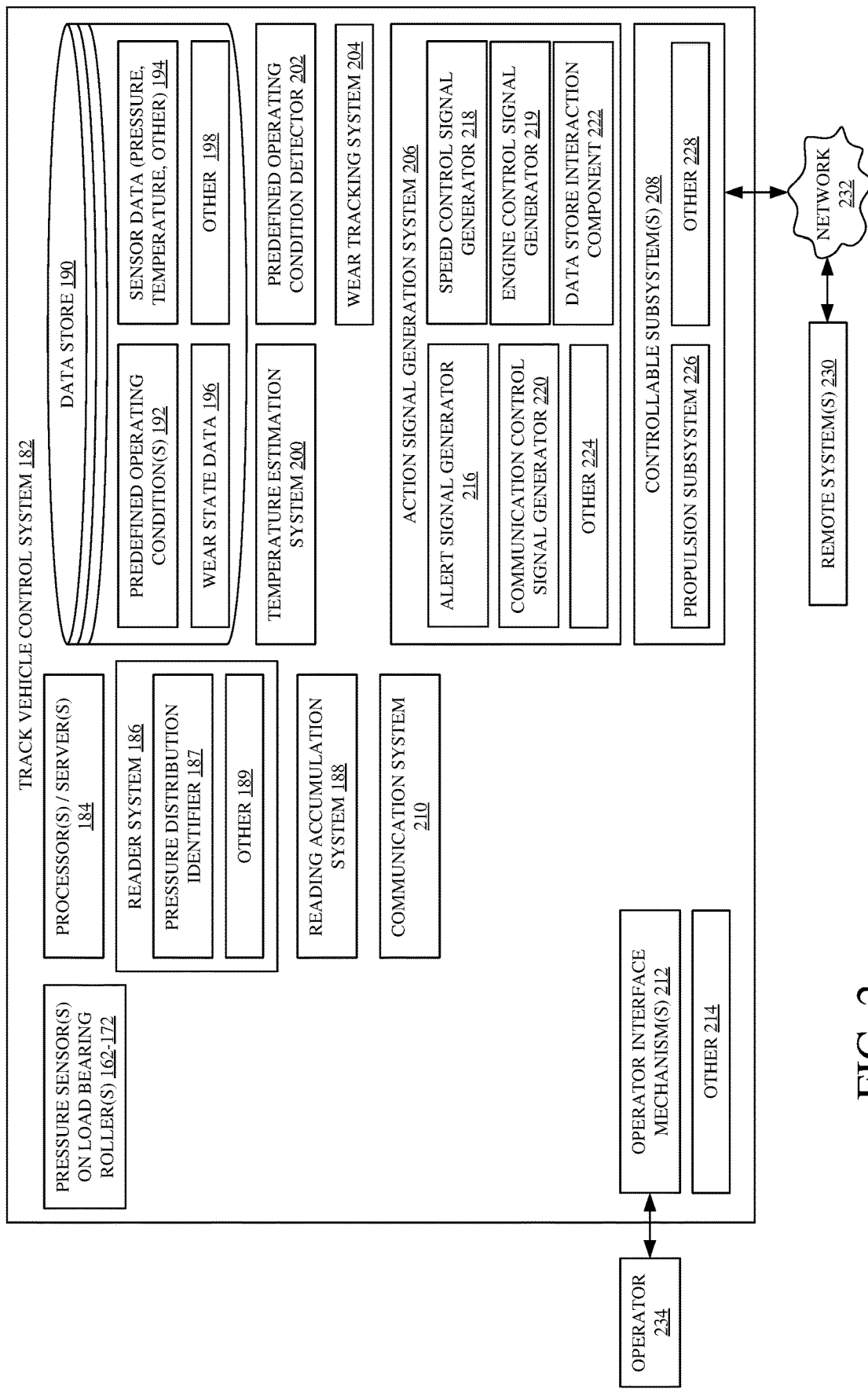
FIG. 2 is a block diagram showing one example of a track vehicle control system.

FIG. 2 also shows that track vehicle control system 182 can include one or more processors or servers 184, reader system 186, reading accumulation system 188, and data store 190, which can store pre-defined operating conditions 192, sensor data such as pressure, temperature, etc. 194, wear data 196, and a wide variety of other items 198. Control system 182 can also include temperature estimation system 200, pre-defined operation condition detector 202, wear tracking system 204, action signal generation system 206, controllable subsystems 208, communication system 210, operator interface mechanisms 212, and it can include a wide variety of other items 214. Reader system 186 can include pressure distribution identifier 187 and other items 189. Action signal generation system 206, itself, can include alert signal generator 216, speed control signal generator 218, engine control signal generator 219, communication control signal generator 220, data store interaction component 222, and other items 224. Controllable subsystems 208 can include a wide variety of controllable subsystems, such as a propulsion subsystem 226, and other subsystems 228.

FIG. 2 also shows that, in one example, track vehicle control system 182 can be coupled to one or more remote systems 230 over network 232. Remote systems 230 can be farm manager systems, vendor systems, manufacturer systems, or any of a wide variety of other systems. Network 232 can be a local area network, a wide area network, a near field communication network, a cellular communication network, or any of a wide variety of other networks or combinations of networks.

FIG. 2 also shows that an operator 234 can use operator interface mechanisms 212 in order to control and manipulate the track vehicle and track vehicle control system 182. Therefore, operator interface mechanisms 212 can include such things as steering wheels, pedals, levers, joysticks, linkages, displays, touch sensitive display screens, a microphone and audio speaker (where speech recognition and speech synthesis are provided, for instance), and a wide variety of other audio, visual, haptic and mechanical or other operator interface mechanisms. Interface mechanisms 212 can be mounted within the operator compartment and/or on mobile devices, etc.

Communication system 210 can be used to facilitate communication of the various items in track vehicle control system 182 with one another, and with remote systems 130 over network 232. Therefore, communication system 210 may vary, based upon the particular type of communication that it is to facilitate.

Reader system 186 illustratively reads the signals from pressure sensors 162-172. In one example, the sensors may be passive sensors, such as battery-free RFID sensors. These types of sensors may be powered from an RFID reader in reader system 186. In an example where there are a plurality of sensors 162-172 deployed across the width of a weight bearing roller, then there may be a set of RFID readers also placed over the width of track 118, to read those sensors. The reader system 186 can thus have multiple readers mounted to the frame, within the periphery defined by the track 118. They may be mounted to the undercarriage of the tractor, or elsewhere. Where the individual sensors are addressable, then multiple sensors can be read by one reader system 186. Reader system 186 can also perform sensor signal conditioning operations, such as filtering, amplification, linearization, normalization, etc. Pressure distribution identifier 187 can identify a pressure distribution across the width of the track based on the sensor signal values. The sensor signal values can be output from reader system 186 to reading accumulation system 188. Reading accumulation system 188 can accumulate sensor signal value readings, over time. These accumulated readings can be used by temperature estimation system 200 and wear tracking system 204. The accumulated readings may, for instance, indicate a number of revolutions of track 118, under different load conditions. This information can be used by wear tracking system 204 to track the wear condition of that particular track 118. Temperature estimation system 200 can estimate the temperature in the track, based upon the pressure values. For instance, the stresses experienced in the track 188, as it is compressed and released during operation, may be modeled by a model. In that case, temperature estimation system 200 can use the pressure readings and/or pressure distribution generated by reader system 186 to access the model, and to generate an estimate of the temperature profile across the width of the track 118. In another example, additional inputs are also used to determine the temperature distribution. Such inputs can include roller speed or track speed from a speed sensor, ambient temperature from an ambient temperature sensor, and/or the roller material composition, which may be pre-programmed into the system, input by an operator, etc. The estimated temperature can also be provided to wear tracking system 204, as it will bear on the estimated wear that the track 118 is undergoing.

Pre-defined operating condition detector 202 illustratively receives the pressure readings, from system 186, the accumulated readings from system 188, and/or the temperature estimations from system 200 and determines whether any pre-defined operating conditions are present, that may need to be addressed by action signal generation system 206. For instance, it may be that pre-defined operating conditions 192 specify a temperature that indicates critical wear conditions are occurring in the track 118. Therefore, pre-defined operating condition detector 202 may access the pre-defined operating conditions (which may be a temperature threshold value) and compare it to the temperature values output by system 200 to determine whether the temperature of the track is approaching a critical temperature at which damage, failure, or excessive wear may occur. When the pre-defined operating condition is detected by detector 202, it illustratively provides an output to action signal generation system 206 which can take various actions based upon the particular pre-defined operating condition that has been detected. Similarly, wear tracking system 204 can provide an output to action signal generation system 206, so that system 206 can take action based upon the wear the track 118 has undergone.

It will also be noted that the various system 186, 188, 200 and 204, and the pre-defined operating condition detector 202, can all provide information to data store 190 to store information in data store 190. Therefore, data store 190 can store sensor data 194 (which may include pressure temperature, etc.), wear state data 196 output by wear tracking system 204, which may identify the particular wear state of each of the tracks 118 on the track vehicle on which track vehicle control system 182 is deployed, and a wide variety of other information 198.

Action signal generation system 206 can take a wide variety of different actions, based upon the information it receives. Alert signal generator 216 can control operator interface mechanisms 212 to generate an audio alert, a visual alert, a haptic alert, etc. Speed control signal generator 218 can output a control signal to control the propulsion system 226 in controllable subsystems 208 in order to reduce the speed of the track vehicle. For instance, the speed of the trace vehicle can be sensed by control system 182 using a suitable sensor (such as a GPS receiver, an axle speed sensor, another type of ground speed sensor, etc.). Speed control signal generator 218 can then generate control signals to control propulsion system 226 to reduce the speed, when the tracks are reaching an unacceptable temperature. Speed control signal generator 218 can also generate control signals to control propulsion system 226 to increase the speed of the track vehicle, once the tracks cool down. Engine control signal generator 219 can generate control signals to control the engine, such as engine speed, engine power, etc.

Communication control signal generator 220 can control communication system 210 to communicate with remote systems 230. For instance, it may be that remote systems 230 include a vendor system which is used to replace worn tracks on the various track vehicles in a fleet. In that case, the wear data may be provided to remote systems 230. Remote systems 230 may be deployed at a farm manager site, and the farm manager may be alerted when an operator is driving a vehicle in such a way that compromises the integrity of the various tracks on that vehicle. These are just examples.

Data store interaction component 222 can generate an output to store an indication of what action signals have been generated, in data store 190 or elsewhere.

Figure 3A:
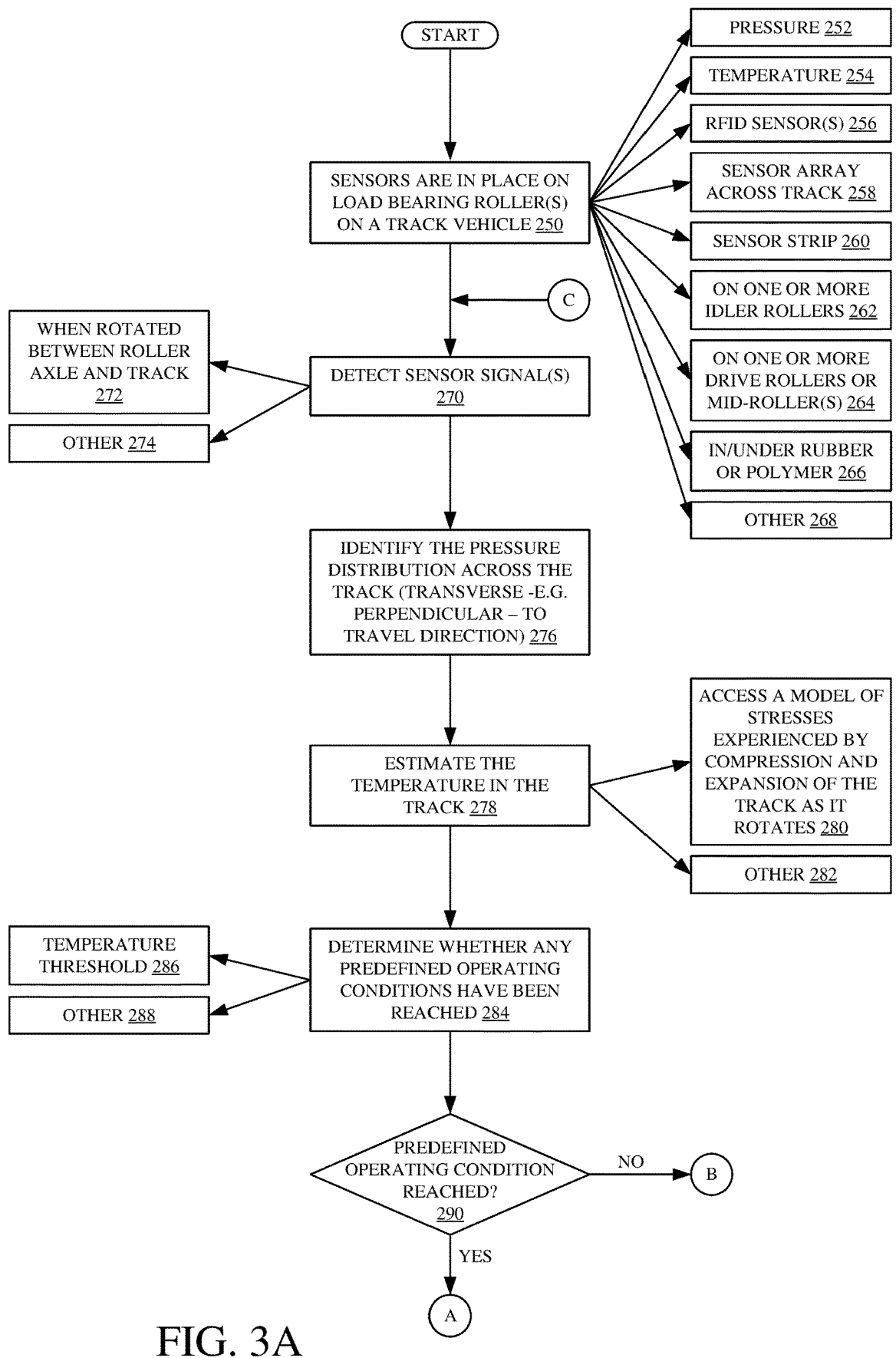
FIGS. 3A and 3B (collectively referred to herein as FIG. 3) show a flow diagram illustrating one example of the operation of the track vehicle control system, shown in FIG. 2, in controlling the track vehicle based on sensor signals received from sensors on the ground-engaging track subsystems.
Figure 3B:
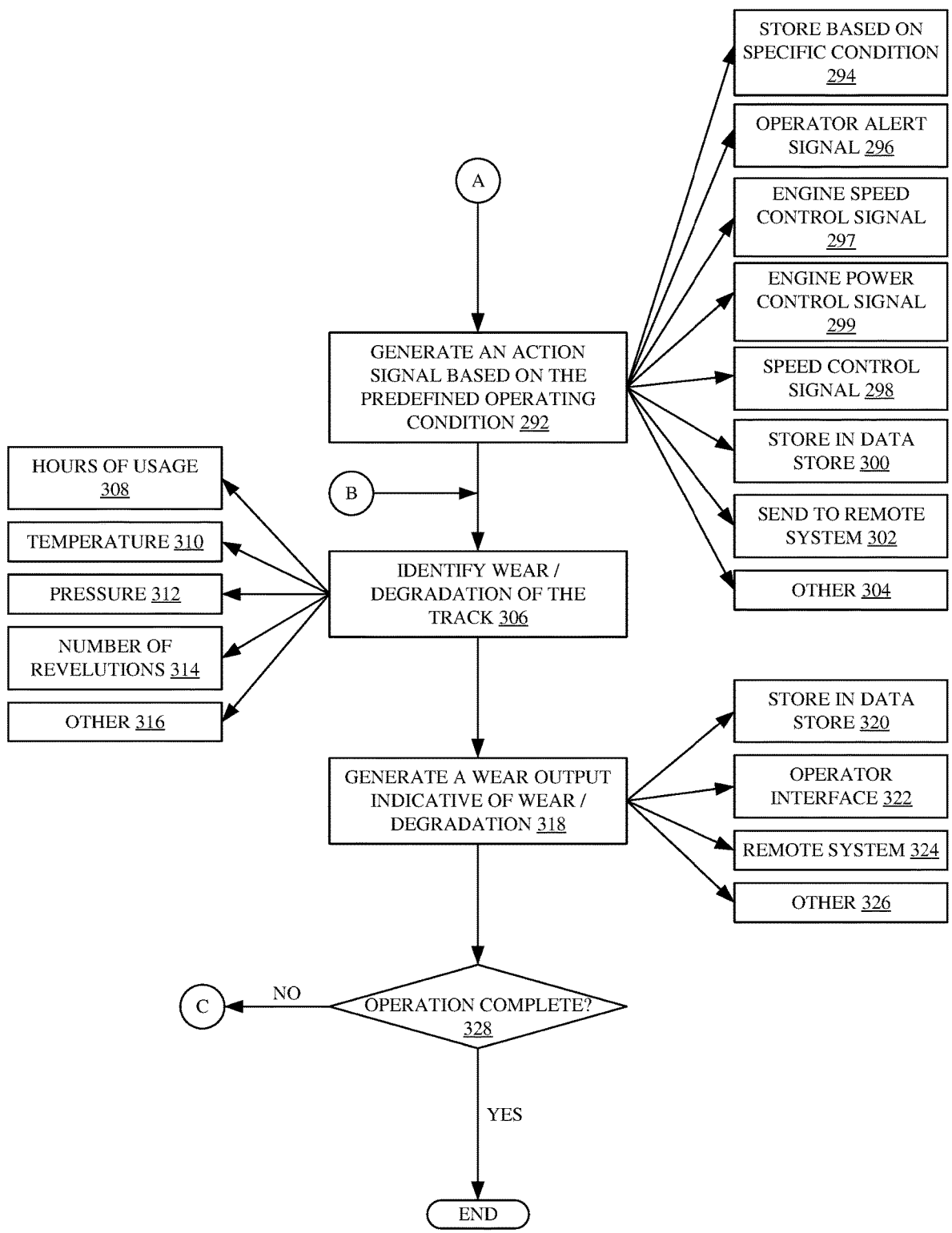

FIGS. 3A and 3B show a flow diagram illustrating one example of the operation of track vehicle control system 182, in more detail. It is first assumed that sensors are in place on a load bearing roller of a track subsystem on a track vehicle. This is indicated by block 250 in the flow diagram of FIG. 3. The sensors can be pressure sensors 252. The sensors can be temperature sensors 254. The sensors can be RFID sensors 256. They can also be arranged as a sensor array across the width of the track 118 in a direction transverse to (e.g., perpendicular to) the direction of travel of the track 118. Arranging the sensors as a sensor array across the track is indicated by block 258. The sensors can be strip-type sensors 260. They can be arranged on one or more of the idler rollers on each of the track subsystems on a track vehicle. This is indicated by block 262. They can be on one or more of the mid rollers, as indicated by block 264. They can be in or under the rubber or polymer coating disposed about the roller on which they are mounted. This is indicated by block 266. They can be arranged in a wide variety of other ways as well, and this is indicated by block 268.

Reader system 186 then detects the sensor signals, or reads the sensor signal values. This is indicated by block 270. The sensor signals are illustratively read, at least when the sensors are rotated between the roller axle (e.g., axle 113) and track 118. This is indicated by block 272 and results in reading the sensor when it is in a load sensing position, outputting a pressure signal indicative of the load being imparted on the track, by that roller against the ground. The sensors may be RFID sensors so the sensor signals can be read using RFID readers. This is just one example. This is indicated by block 274.

When multiple pressure sensors are used, pressure distribution identifier 187 then identifies the pressure distribution (or pressure profile) across the track in the direction transverse to the travel direction of the track. This is indicated by block 276 in the flow diagram of FIG. 3.

Reading accumulation system 188 can accumulate various readings generated by system 186. Those readings can also be provided to temperature estimation system 200. Temperature estimation system 200 estimates the temperature in the track, as indicated by block 278. It can access a model of stresses experienced by the compression and expansion of the track, as it rotates, and as that relates to track temperature, in order to estimate the temperature. This is indicated by block 280. It can estimate the temperature profile across the track, or estimate temperature in other ways as well, and this is indicated by block 282.

Pre-defined operating condition detector 202 then determines whether any pre-defined operating conditions have been reached. This is indicated by block 284. For instance, it can access pre-defined operating conditions 192, which may identify temperature or pressure thresholds that indicate critical wear, imminent failure, etc., for a track. Comparing the estimated temperature to a temperature threshold to identify pre-defined operating conditions is indicated by block 286 in the flow diagram of FIG. 3. Pre-defined operating condition detector 202 can detect whether any other pre-defined operating conditions are present in a wide variety of other ways as well, and this is indicated by block 288.

If a pre-defined operating condition exists, as indicated by block 290, then detector 202 provides an output indicative of this to action signal generation system 206. Action signal generation system 206 can generate any of a wide variety of different types of action signals based upon the pre-defined operating condition. This is indicated by block 292. For example, the action signal can be based upon the specific condition that is detected. This is indicated by block 294. If, for instance, the detected condition is an imminent track failure, then one type of action signal may be generated. If the detected condition is that the track temperature is approaching a temperature which will damage the track, then another type of action signal may be generated. These are examples only.

In one example, alert signal generator 216 generates an operator alert signal that can be provided using one of operator interface mechanisms 212 to operator 234. Generating an operator alert signal is indicated by block 296.

In another example, engine control signal generator 219 can generate control signals to control such things as engine speed 297, engine power 299, etc.

In another example, speed control signal generator 218 generates a speed control signal to control propulsion system 226 to control the speed of the track vehicle. Generating a speed control signal is indicated by block 298. Data store interaction component 222 can generate an action signal to store information in data store 190. This is indicated by block 300 in the flow diagram of FIG. 3. Communication control signal generator 220 can generate a control signal to control communication system 210. This can be done to send information to one or more remote systems 230 indicative of the pre-defined operating condition that was sensed, or other information. Generating a communication control signal to send information to remote systems 230 is indicated by block 302 in the flow diagram of FIG. 3. A wide variety of other action signals can be generated. This is indicated by block 304.

During operation of the track vehicle, wear tracking system 204 can also identify wear or degradation of the track. This is indicated by block 306. The wear or degradation may be indicated by the hours of track usage, as illustrated by block 308. It may be indicated by the estimated temperature, and the amount of time that the track is at or above various different temperatures. This is indicated by block 310. The wear or degradation may be based upon the sensed pressure and/or the time that the track is under various pressures, or the number of pressure changes induced in the track based upon operation of the track vehicle. This is indicated by block 312. The wear or degradation may be based upon the number of revolutions of the track, as indicated by block 314. The sensor signals may indicate the number of revolutions or this may be sensed in other ways as well. The wear or degradation of the track can be identified in other ways as well. This is indicated by block 316.

Wear tracking system 204 then generates a wear output indicative of the identified wear or degradation of the track. This is indicated by block 318. The wear output can be stored in data store 190 as wear state data 196. Storing the wear data in data store 190 is indicated by block 320 in the flow diagram of FIG. 3.

The wear output can be provided to operator interface mechanisms 212 where it is used to generate an output to operator 234. For instance, the wear (or remaining life) on the various tracks in the track subsystems on the track vehicle may be displayed to the operator, so that the operator can take maintenance action to replace the tracks, when needed. Generating an operator interface showing the wear or degradation data is indicated by block 322 in the flow diagram of FIG. 3. The wear or degradation data can also be output, using communication system 210, to one or more remote systems 230. For instance, when the tracks are about to become worn out, this may be communicated to a track vendor which is in charge of replacing the tracks on the vehicle. The information may be provided to a remote system at a farm manager computing system, or to other remote systems. Providing the wear or degradation data to a remote system 230 is indicated by block 324 in the flow diagram of FIG. 3. The wear output can be generated in other ways, and it can be output to other systems. This is indicated by block 326. Unless the vehicle operation is complete, as indicated by block 328, then operation reverts to block 270 where track vehicle control system 182 continues to detect the sensor signals (or read them) from the various sensors in the track subsystems.

The present discussion has mentioned processors and servers. In one example, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 4:
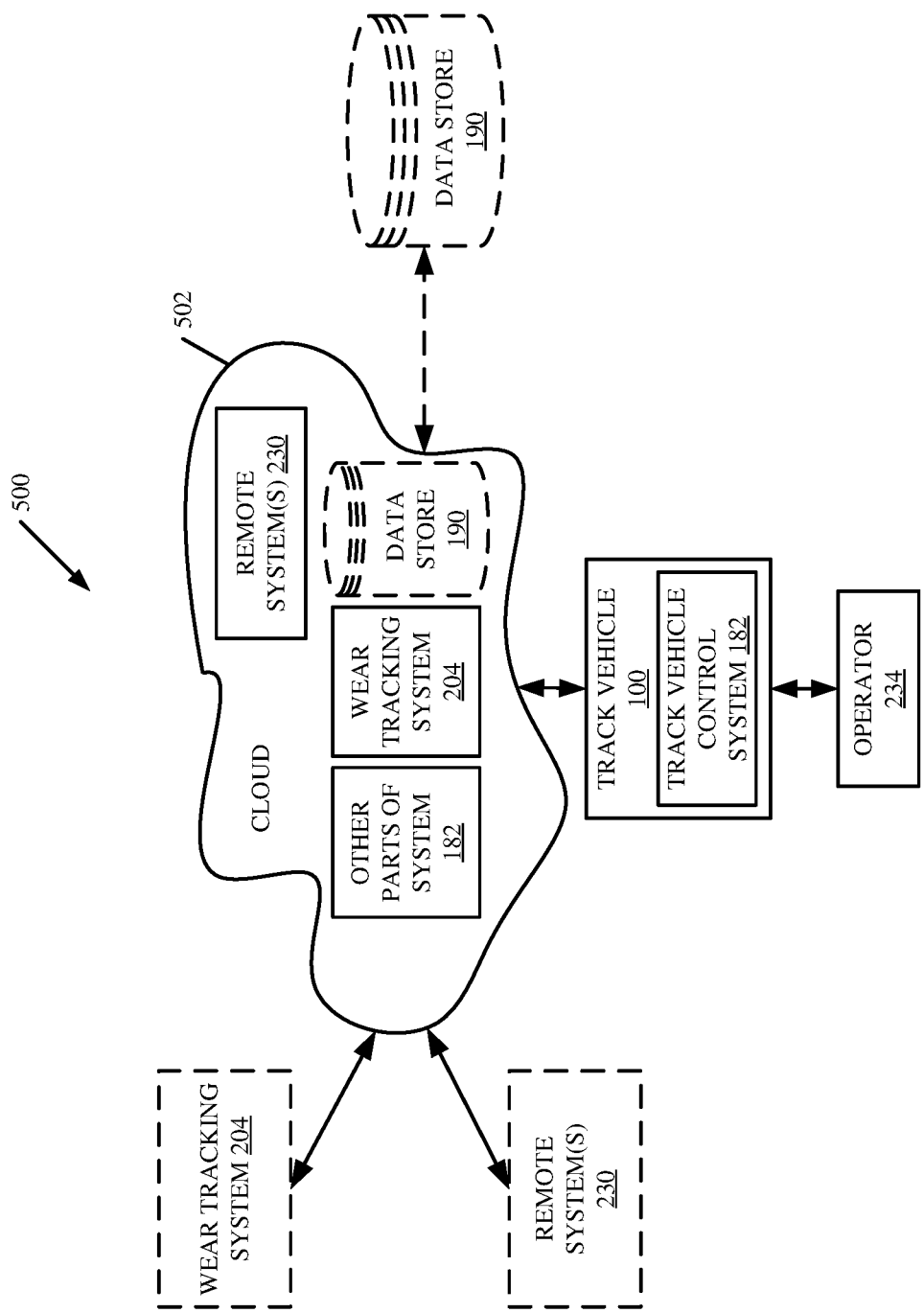
FIG. 4 is a block diagram showing one example of the track vehicle control system, illustrated in FIG. 2, deployed in a remote server environment.

FIG. 4 is a block diagram of track vehicle control system 182, shown in FIG. 2, except that it communicates with elements in a remote server architecture 500. In an example, remote server architecture 500 can provide computation, software, data access, and storage services that do not require end-user knowledge of the physical location or configuration of the system that delivers the services. In various examples, remote servers can deliver the services over a wide area network, such as the internet, using appropriate protocols. For instance, remote servers can deliver applications over a wide area network and they can be accessed through a web browser or any other computing component. Software or components shown in FIG. 2 as well as the corresponding data, can be stored on servers at a remote location. The computing resources in a remote server environment can be consolidated at a remote data center location or they can be dispersed. Remote server infrastructures can deliver services through shared data centers, even though they appear as a single point of access for the user. Thus, the components and functions described herein can be provided from a remote server at a remote location using a remote server architecture. Alternatively, they can be provided from a conventional server, or they can be installed on client devices directly, or in other ways.

In the example shown in FIG. 4, some items are similar to those shown in FIG. 2 and they are similarly numbered. FIG. 4 specifically shows that some items of track vehicle control system 182 can be located at a remote server location 502. Therefore, the track vehicle accesses those systems through remote server location 502.

FIG. 4 also depicts another example of a remote server architecture. FIG. 4 shows that it is also contemplated that some elements of system 182 can be disposed at remote server location 502 while others are not. By way of example, wear tracking system 204 or remote systems 230 can be disposed at a location separate from location 502, and accessed through the remote server at location 502. Regardless of where they are located, they can be accessed directly by the track vehicle, through a network (either a wide area network or a local area network), they can be hosted at a remote site by a service, or they can be provided as a service, or accessed by a connection service that resides in a remote location. Also, the data can be stored in substantially any location and intermittently accessed by, or forwarded to, interested parties. For instance, physical carriers can be used instead of, or in addition to, electromagnetic wave carriers. In such an example, where cell coverage is poor or nonexistent, another mobile machine (such as a fuel truck) can have an automated information collection system. As the track vehicle comes close to the fuel truck for fueling, the system automatically collects the information from the track vehicle using any type of ad-hoc wireless connection. The collected information can then be forwarded to the main network as the fuel truck reaches a location where there is cellular coverage (or other wireless coverage). For instance, the fuel truck may enter a covered location when traveling to fuel other machines or when at a main fuel storage location. All of these architectures are contemplated herein. Further, the information can be stored on the track vehicle until the track vehicle enters a covered location. The track vehicle, itself, can then send the information to the main network.

It will also be noted that the elements of FIG. 2, or portions of them, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 5:
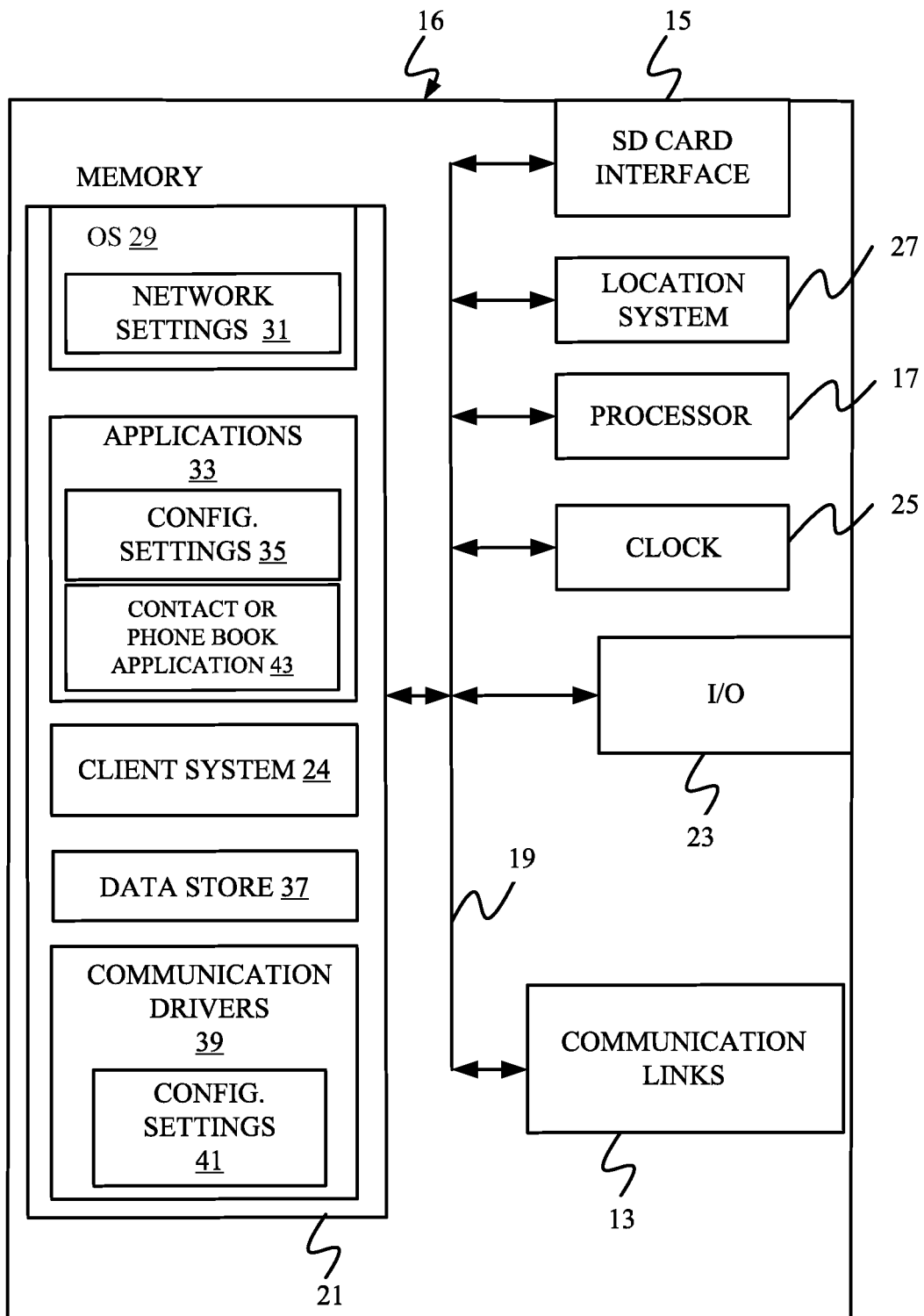
FIGS. 5-7 show examples of mobile devices that can be used in the architectures shown in the previous figures.
Figure 6:
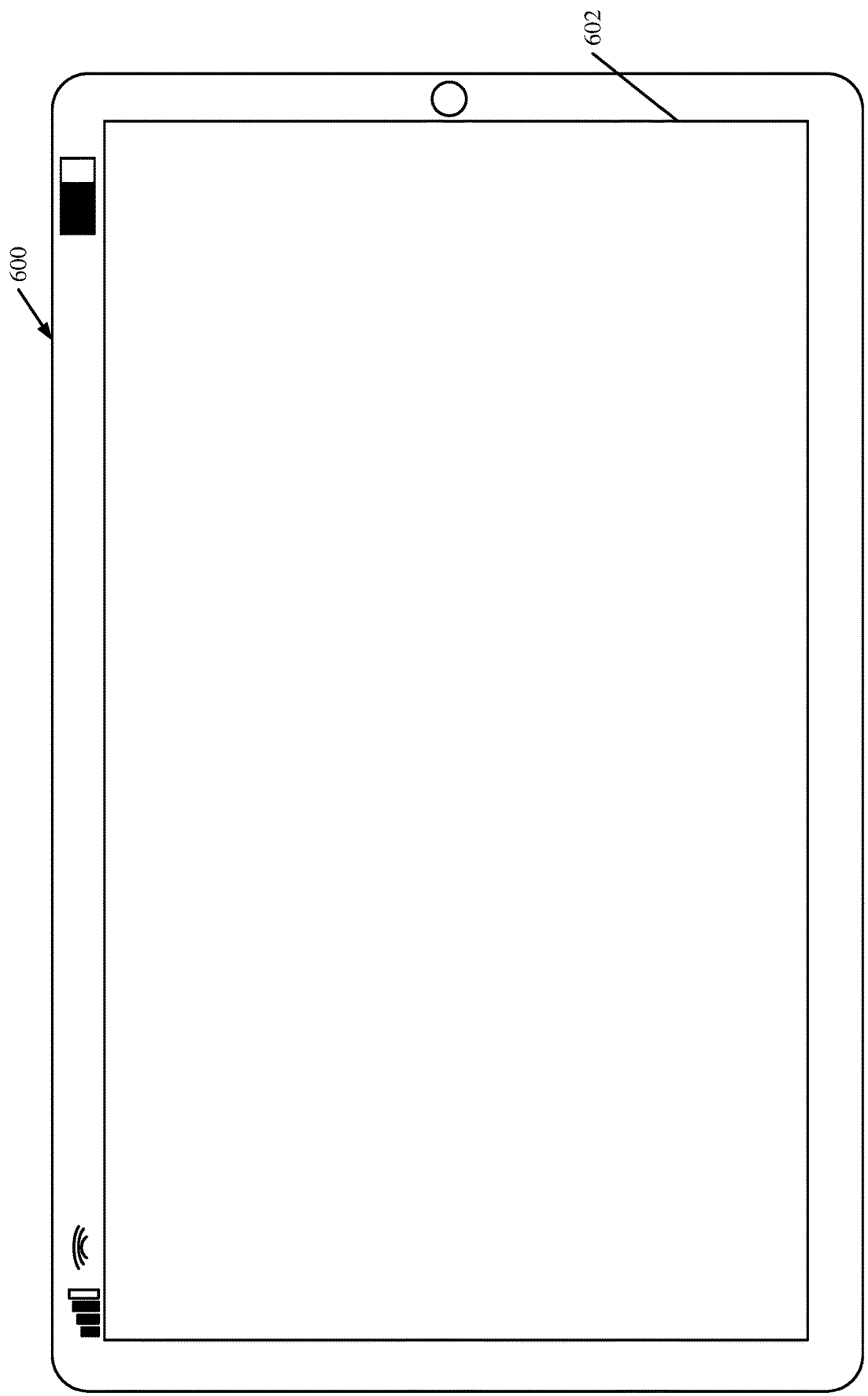
Figure 7:
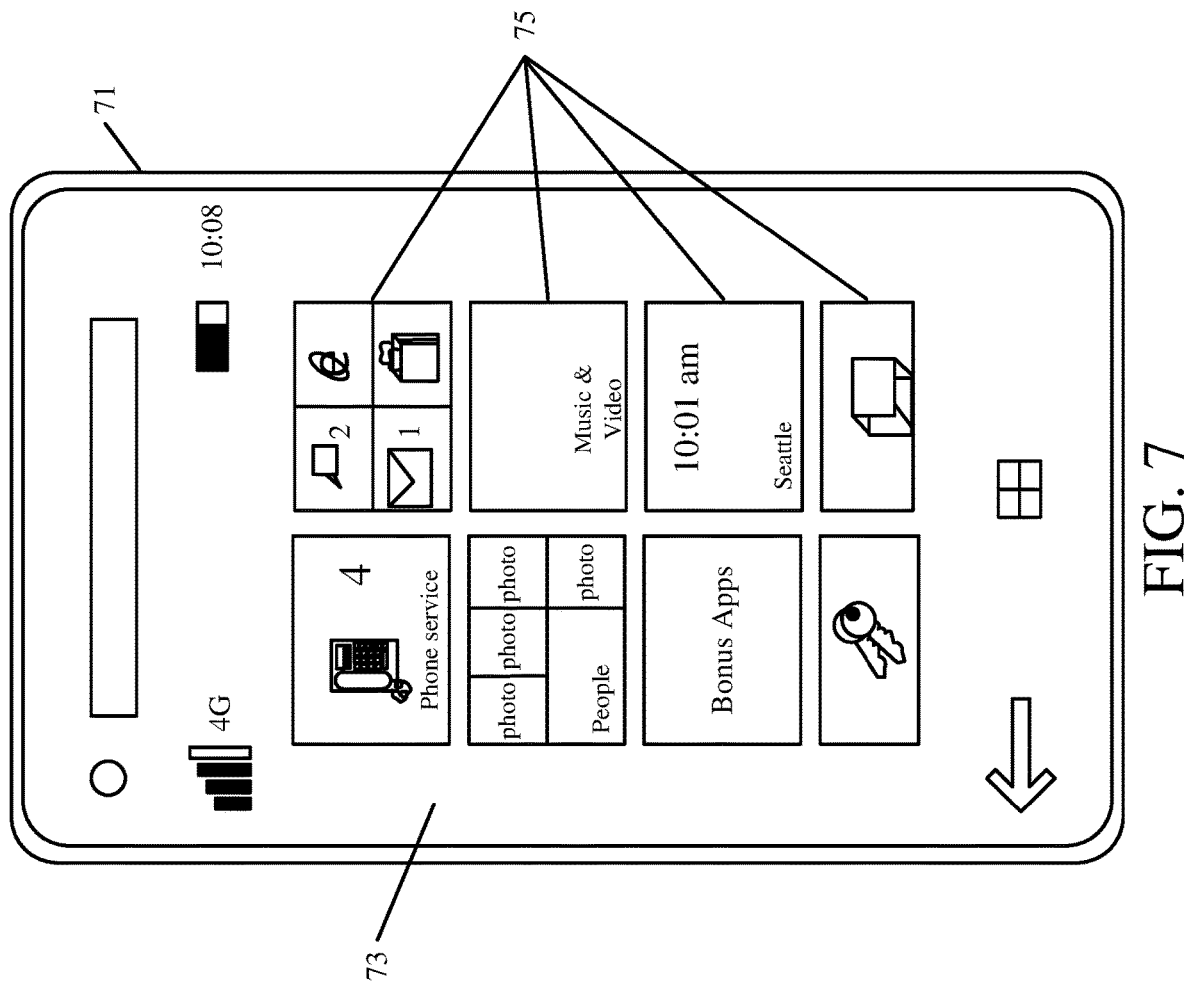

FIG. 5 is a simplified block diagram of one illustrative example of a handheld or mobile computing device that can be used as a user's or client's hand held device 16, in which the present system (or parts of it) can be deployed. For instance, a mobile device can be deployed in the operator compartment of the track vehicle for use in generating, processing, or displaying the stool width and position data. FIGS. 6-7 are examples of handheld or mobile devices.

FIG. 5 provides a general block diagram of the components of a client device 16 that can run some components shown in FIG. 2, that interacts with them, or both. In the device 16, a communications link 13 is provided that allows the handheld device to communicate with other computing devices and in some examples provides a channel for receiving information automatically, such as by scanning. Examples of communications link 13 include allowing communication though one or more communication protocols, such as wireless services used to provide cellular access to a network, as well as protocols that provide local wireless connections to networks.

In other examples, applications can be received on a removable Secure Digital (SD) card that is connected to an interface 15. Interface 15 and communication links 13 communicate with a processor 17 (which can also embody processors or servers from previous FIGS.) along a bus 19 that is also connected to memory 21 and input/output (I/O) components 23, as well as clock 25 and location system 27.

I/O components 23, in one example, are provided to facilitate input and output operations. I/O components 23 for various examples of the device 16 can include input components such as buttons, touch sensors, optical sensors, microphones, touch screens, proximity sensors, accelerometers, orientation sensors and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, contact or phone book application 43, client system 24, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Processor 17 can be activated by other components to facilitate their functionality as well.

FIG. 6 shows one example in which device 16 is a tablet computer 600. In FIG. 6, computer 600 is shown with user interface display screen 602. Screen 602 can be a touch screen or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

FIG. 7 shows that the device can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 8:
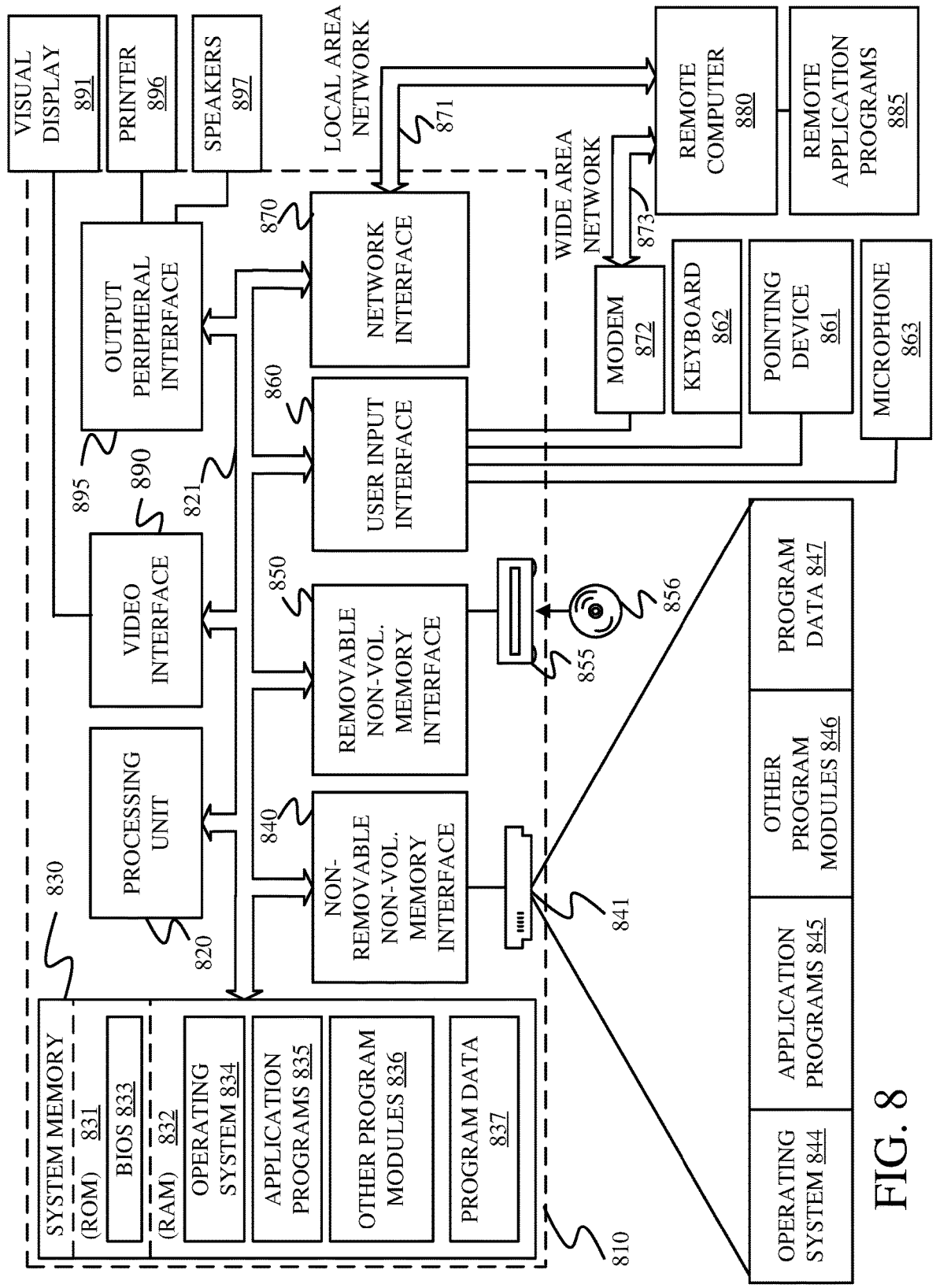
FIG. 8 is a block diagram showing one example of a computing environment that can be used in the architectures shown in the previous figures.

FIG. 8 is one example of a computing environment in which elements of FIG. 2, or parts of it, (for example) can be deployed. With reference to FIG. 8, an example system for implementing some embodiments includes a computing device in the form of a computer 810 programmed to operate as discussed above. Components of computer 810 may include, but are not limited to, a processing unit 820 (which can comprise processors or servers from previous FIGS.), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. Memory and programs described with respect to FIG. 2 can be deployed in corresponding portions of FIG. 8.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 8 illustrates operating system 834, application programs 835, other program modules 836, and program data 837.

The computer 810 may also include other removable/non-removable volatile/nonvolatile computer storage media. By way of example only, FIG. 8 illustrates a hard disk drive 841 that reads from or writes to non-removable, nonvolatile magnetic media, an optical disk drive 855, and nonvolatile optical disk 856. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (e.g., ASICs), Application-specific Standard Products (e.g., ASSPs), System-on-a-chip systems (SOCs), Complex Programmable Logic Devices (CPLDs), etc.

The drives and their associated computer storage media discussed above and illustrated in FIG. 8, provide storage of computer readable instructions, data structures, program modules and other data for the computer 810. In FIG. 8, for example, hard disk drive 841 is illustrated as storing operating system 844, application programs 845, other program modules 846, and program data 847. Note that these components can either be the same as or different from operating system 834, application programs 835, other program modules 836, and program data 837.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures. A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections (such as a controller area network—CAN, a local area network—LAN, or wide area network WAN) to one or more remote computers, such as a remote computer 880.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. In a networked environment, program modules may be stored in a remote memory storage device. FIG. 8 illustrates, for example, that remote application programs 885 can reside on remote computer 880.

It should also be noted that the different examples described herein can be combined in different ways. That is, parts of one or more examples can be combined with parts of one or more other examples. All of this is contemplated herein.

Example 1 is a track vehicle comprising:
a frame;
a track subsystem comprising:
a first roller assembly including a first axle coupled to the frame and a rotatable first roller;
a second roller assembly including a second axle coupled to the frame and a rotatable second roller mounted for rotation with the second axle;
a track mounted for rotation about the first and second rollers to drive movement of the track vehicle over a surface; and a sensor on the first roller assembly that senses a load imparted on the track by the first roller, against the surface, and generates a sensor signal indicative of the sensed load; and a control system that generates an action signal based on the sensed load.

Example 2 is the track vehicle of any or all previous examples wherein the track has a width in a direction generally parallel to a longitudinal axis of the first axle and wherein the sensor is configured to sense the load at a plurality of places along the width of the track.

Example 3 is the track vehicle of any or all previous examples wherein the sensor comprises:

a plurality of sensors, each generating a sensor signal, on the first roller and spaced in a direction generally parallel to the longitudinal axis of the first axle.

Example 4 is the track vehicle of any or all previous examples wherein each of the plurality of sensors comprises:

a radio frequency identification (RFID) sensor.

Example 5 is the track vehicle of any or all previous examples wherein the control system comprises:

a reader system configured to read the sensor signal and generate a load value, indicative of the load, based on the sensor signal.

Example 6 is the track vehicle of any or all previous examples wherein the control system further comprises:

a reading accumulation system that accumulates an indication of a plurality of the load values over time.

Example 7 is the track vehicle of any or all previous examples wherein the control system further comprises:

a temperature estimation system configured to receive the accumulated indication of the plurality of load values and generate a temperature estimation output indicative of an estimated track temperature.

Example 8 is the track vehicle of any or all previous examples wherein the control system further comprises:

a pressure distribution identifier configured to identify a pressure distribution across the width of the track based on the sensor signals.

Example 9 is the track vehicle of any or all previous examples wherein the temperature estimation system is configured to estimate a temperature distribution across the width of the track based on a set of pressure distributions.

Example 10 is the track vehicle of any or all previous examples wherein the control system further comprises:

a predefined operating condition detector configured to receive the estimated track temperature and access predefined operating condition data and detect whether a predefined operating condition exists based on the estimated track temperature and the predefined operating condition data and to generate an operating condition output indicative of a detected operating condition.

Example 11 is the track vehicle of any or all previous examples wherein the control system further comprises:

a speed control signal generator configured to generate a speed control signal to control a speed of rotation of the track based on the detected operating condition.

Example 12 is the track vehicle of any or all previous examples wherein the control system further comprises:

an alert signal generator configured to generate an alert signal based on the detected operating condition.

Example 13 is the track vehicle of any or all previous examples and further comprising:

an engine speed control signal generator that generates an engine speed control signal to control engine speed based on the detected operating conditions.

Example 14 is the track vehicle of any or all previous examples and further comprising:

an engine power control signal generator that generates an engine power control signal to control engine power based on the detected operating condition.

Example 15 is the track vehicle of any or all previous examples wherein the control signal further comprises:

a wear tracking system configured to generate a wear indicator output, indicative of wear on the track, based on the sensor signal.

Example 16 is a track subsystem for a track vehicle, the track subsystem comprising:

a first roller assembly including first axle coupled to the frame and a first roller mounted for rotation with the first axle;

a second roller assembly including a second axle coupled to the frame and a second roller mounted for rotation with the second axle;

a track mounted for rotation about the first and second rollers to drive movement of the track vehicle over a surface; and a sensor on the first roller assembly that senses a load imparted on the track by the first roller, against the surface, and generates a sensor signal indicative of the sensed load.

Example 17 is the track subsystem of any or all previous examples wherein the track has a width in a direction generally parallel to a longitudinal axis of the first axle and wherein the sensor is configured to sense the load at a plurality of places along the width of the track.

Example 18 is the track subsystem of any or all previous examples wherein the sensor comprises:

a plurality of radio frequency identification (RFID) sensors, each generating a sensor signal, on the first roller and spaced in a direction generally parallel to the longitudinal axis of the first axle.

Example 19 is the track subsystem of any or all previous examples and further comprising:

a reader system configured to read the sensor signals and generate a load value, indicative of the load, based on the sensor signals.

Example 20 is a track vehicle control system, comprising:

a sensor mounted on a track subsystem, the track subsystem including a first roller assembly that includes a first axle coupled to a frame and a rotatable first roller, a second roller assembly that includes a second axle coupled to the frame and a rotatable second roller, and a track mounted for rotation about the first and second rollers to drive movement of the track vehicle over a surface, the sensor being mounted for rotation with the first roller, the sensor sensing a load imparted on the track by the first roller, against the surface, and generating a sensor signal indicative of the sensed load;

a reader system configured to read the sensor signal and generate a load value, indicative of the load, based on the sensor signal;

a reading accumulation system that accumulates an indication of a plurality of load values over time;

a temperature estimation system configured to receive the accumulated indication of the plurality of load values and generate a temperature estimation output indicative of an estimated track temperature; and an action signal generation system that generates an action signal based on the estimated track temperature.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A track vehicle comprising:
   a frame;
   a track subsystem comprising:
      a first roller assembly including a first axle coupled to the frame and a rotatable first roller;
      a second roller assembly including a second axle coupled to the frame and a rotatable second roller mounted for rotation with the second axle;
      a track mounted for rotation about the first and second rollers to drive movement of the track vehicle over a surface; and
      a sensor on the first roller that senses a load imparted on the track by the first roller, against the surface, and generates a sensor signal indicative of the sensed load:
   one or more processors; and
   a data store that stores a set of computer executable instructions that, when executed by the one or more processors, configure the one or more processors to:
      estimate a temperature distribution across the width of the track by accessing a model of stresses experienced by compression and expression of the track as the track rotates.

2. The track vehicle of claim 1 wherein the sensor comprises:
   a plurality of sensors on the first roller and spaced in a direction generally parallel to the longitudinal axis of the first axle and in-line, each sensor, of the plurality of sensors, being configured to rotate between a load sensing position and a non-load sensing position based on rotation of the first roller and, when in the load sensing position, generates a sensor signal.

3. The track vehicle of claim 2 wherein each of the plurality of sensors comprises:
   a radio frequency identification (RFID) sensor.

4. The track vehicle of claim 1, wherein the computer executable instructions, when executed by the one or more processors, further configure the one or more processors to:
   read the sensor signal and generate a load value, indicative of the load, based on the sensor signal.

5. The track vehicle of claim 4, wherein the computer executable instructions, when executed by the one or more processors, further configure the one or more processors to:
   accumulate an indication of a plurality of the load values over time.

6. The track vehicle of claim 5, wherein the computer executable instructions, when executed by the one or more processors, further configure the one or more processors to:
   receive the accumulated indication of the plurality of load values and generate a temperature estimation output indicative of the estimated temperature distribution across the width of the track.

7. The track vehicle of claim 6, wherein the computer executable instructions, when executed by the one or more processors, further configure the one or more processors to:
   receive the estimated temperature distribution and access predefined operating condition data and detect whether a predefined operating condition exists based on the estimated temperature distribution and the predefined operating condition data and to generate an operating condition output indicative of a detected operating condition.

8. The track vehicle of claim 7, wherein the computer executable instructions, when executed by the one or more processors, further configure the one or more processors to:
   generate an action signal based on the detected operation condition.

9. The track vehicle of claim 8, wherein the computer executable instructions, when executed by the one or more processors, further configure the one or more processors to:
   generate, as the action signal, an engine speed control signal to control engine speed based on the detected operating conditions.

10. The track vehicle of claim 8, wherein the one or more processors are configured to implement:
    generate, as the action signal, an engine power control signal to control engine power based on the detected operating condition.

11. The track vehicle of claim 7, wherein the computer executable instructions, when executed by the one or more processors, further configure the one or more processors to:
    generate an alert signal based on the detected operating condition.

12. The track vehicle of claim 1, wherein the first roller assembly further comprises a third rotatable roller, wherein the sensor comprises a first sensor on the first roller that senses the load imparted on the track by the first roller, against the surface, and generates a first sensor signal indicative of the sensed load, the track vehicle further comprising a second sensor on the third roller that senses a load imparted on the track by the third roller, against the surface, and generates a second sensor signal indicative of the sensed load, and wherein the computer executable instructions, when executed by the one or more processors, further configure the one or more processors to:
    identify a pressure distribution across the width of the track based on the first sensor signal and the second sensor signal.

13. The track vehicle of claim 12, wherein the computer executable instructions, when executed by the one or more processors, further configure the one or more processors to:
    Estimate the temperature distribution across the width of the track based, at least in part, on the pressure distribution across the width of the track.

14. The track vehicle of claim 13, wherein the computer executable instructions, when executed by the one or more processors, further configure the one or more processors to:
    obtain ambient temperature data, speed data, and material composition data, indicative of a material composition of the first roller; and
    estimate the temperature distribution across the width of the track based on the pressure distribution, the ambient temperature data, the speed data, and the material composition data.

15. The track vehicle of claim 1, wherein the computer executable instructions, when executed by the one or more processors, further configure the one or more processors to:
    generate a wear indicator output indicative of a remaining life of the track based at least in part on the sensor signal; and control an operator interface mechanism to generate an indication indicative of the remaining life of the track based on the wear indicator output.

16. A track subsystem for a track vehicle, the track subsystem comprising:
a first roller assembly including:
a first axle coupled to a frame;
a first roller mounted for rotation with the first axle; and
a second roller mounted for rotation with the first axle; and
a second roller assembly including a second axle coupled to the frame and a third roller mounted for rotation with the second axle;
a track mounted for rotation about the first and second rollers to drive movement of the track vehicle over a surface;
a first sensor on the first roller that senses a first load imparted on the track by the first roller, against the surface, and generates a first load sensor signal indicative of the first sensed load;
a second sensor on the second roller that senses a second load imparted on the track by the second roller, against the surface, and generates a second load sensor signal indicative of the second sensed load;
one or more processors;
a data store that stores a set of computer executable instructions that, when executed by the one or more processors, configure the one or more processors to:
access a model that models stresses experienced in the track as the track rotates; and
estimate a temperature in the track based on the accessed model.

17. The track subsystem of claim 16 wherein the first sensor comprises a first plurality of radio frequency identification (RFID) sensors, each generating a load sensor signal, on the first roller and spaced in a direction generally parallel to the longitudinal axis of the first axle and wherein the second sensor comprises a second plurality of RFID sensors, each generating a load sensor signal, on the second roller and spaced in a direction generally parallel to the longitudinal axis of the first axle.

18. The track subsystem of claim 17 wherein the first roller is a first mid-roller and the second roller is a second mid-roller and wherein the first plurality of sensors are in-line with the second plurality of sensors.

19. A track vehicle control system, comprising:
a track subsystem including:
a first roller assembly that includes a first axle coupled to a frame a rotatable first roller and a rotatable second roller spaced apart along the first axle;
a second roller assembly that includes a second axle coupled to the frame and a rotatable third roller; and
a track mounted for rotation about the first and second rollers to drive movement of the track vehicle over a surface; and
a first plurality of sensors mounted for rotation with the first roller, each sensor, of the first plurality of sensors, sensing a load imparted on the track by the first roller, against the surface, and generating a sensor signal indicative of the sensed load;
a second plurality of sensors, mounted for rotation with the second roller, each sensor, of the second plurality of sensors, sensing a load imparted on the track by the second roller, against the surface, and generating a sensor signal indicative of the sensed load:
one or more processors; and
a data store that stores a set of computer executable instructions that, when executed by the one or more processors, configure the one or more processors to:
identify a pressure distribution across a width of the track based on the sensor signals;
access a model of stresses experienced by compression and expression of the track as the track rotates based on the identified pressure distribution;
estimate a temperature distribution across the width of the track based on the accessed model; and
generate an action signal based on the estimated track temperature distribution.

\* \* \* \* \*